United States Patent
Higuchi et al.

(10) Patent No.: US 7,902,281 B2
(45) Date of Patent: Mar. 8, 2011

(54) THERMOPLASTIC RESIN COMPOSITION AND MOLDED ARTICLE THEREOF

(75) Inventors: Choujirou Higuchi, Chigasaki (JP); Tatsuhiro Urakami, Ichihara (JP); Sunil Krzysztof Moorthi, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 12/374,999

(22) PCT Filed: Jul. 11, 2007

(86) PCT No.: PCT/JP2007/063839
§ 371 (c)(1),
(2), (4) Date: Jan. 23, 2009

(87) PCT Pub. No.: WO2008/013057
PCT Pub. Date: Jan. 31, 2008

(65) Prior Publication Data
US 2009/0186992 A1    Jul. 23, 2009

(30) Foreign Application Priority Data
Jul. 26, 2006  (JP) ................................. 2006-203877

(51) Int. Cl.
*C08K 5/16*  (2006.01)
*C07C 229/00*  (2006.01)
(52) U.S. Cl. .......................................... 524/219; 560/41
(58) Field of Classification Search .................. 524/219; 560/41
See application file for complete search history.

(56) References Cited

U.S. PATENT DOCUMENTS

| | | | |
|---|---|---|---|
| 5,110,847 A * | 5/1992 | Kojima et al. ................. | 523/412 |
| 2004/0063830 A1 | 4/2004 | Schmidt et al. | |
| 2005/0192388 A1 * | 9/2005 | Craun et al. ................... | 524/284 |
| 2005/0250857 A1 * | 11/2005 | van Bommel et al. .......... | 516/27 |
| 2006/0057343 A1 * | 3/2006 | Tsuji et al. ..................... | 428/212 |
| 2007/0170398 A1 | 7/2007 | Schmidt et al. | |

FOREIGN PATENT DOCUMENTS

| | | |
|---|---|---|
| JP | 9-278991 A | 10/1997 |
| JP | 10-87975 A | 4/1998 |
| JP | 2003-192884 A | 7/2003 |
| JP | 2004-285121 A | 10/2004 |
| JP | 2005-42084 A | 2/2005 |
| WO | WO 02/46300 A2 | 6/2002 |

OTHER PUBLICATIONS

Partha Pratim Bose et al., Formation of triple helical nanofibers using self-assembling chiral benzene-1,3,5-tricarboxamides and reversal of the nanostructure's handedness using mirror image building blocks, Chemical Communication, 2006, pp. 3196-3198.
International search Report (PCT/ISA/210) dated Aug. 28, 2007.

* cited by examiner

*Primary Examiner* — Milton I Cano
*Assistant Examiner* — John Uselding
(74) *Attorney, Agent, or Firm* — Buchanan Ingersoll & Rooney PC

(57) ABSTRACT

An object of the present invention is to provide a resin composition which is increased in heat resistance (high crystallinity) and transparency without impairing rigidity which a thermoplastic resin inherently has and a molded article containing the resin composition. A thermoplastic resin composition relating to the present invention includes a thermoplastic resin (A) and a crystal nucleating agent (B) composed of tris(amino acid ester)amides of trimesic acid. The crystal nucleating agent (B) is preferably tris(valine ester)amides of trimesic acid or tris(leucine ester)amides of trimesic acid, and the thermoplastic resin (A) is preferably a lactic acid resin and more preferably a polylactic acid.

10 Claims, 4 Drawing Sheets

[Fig.1]
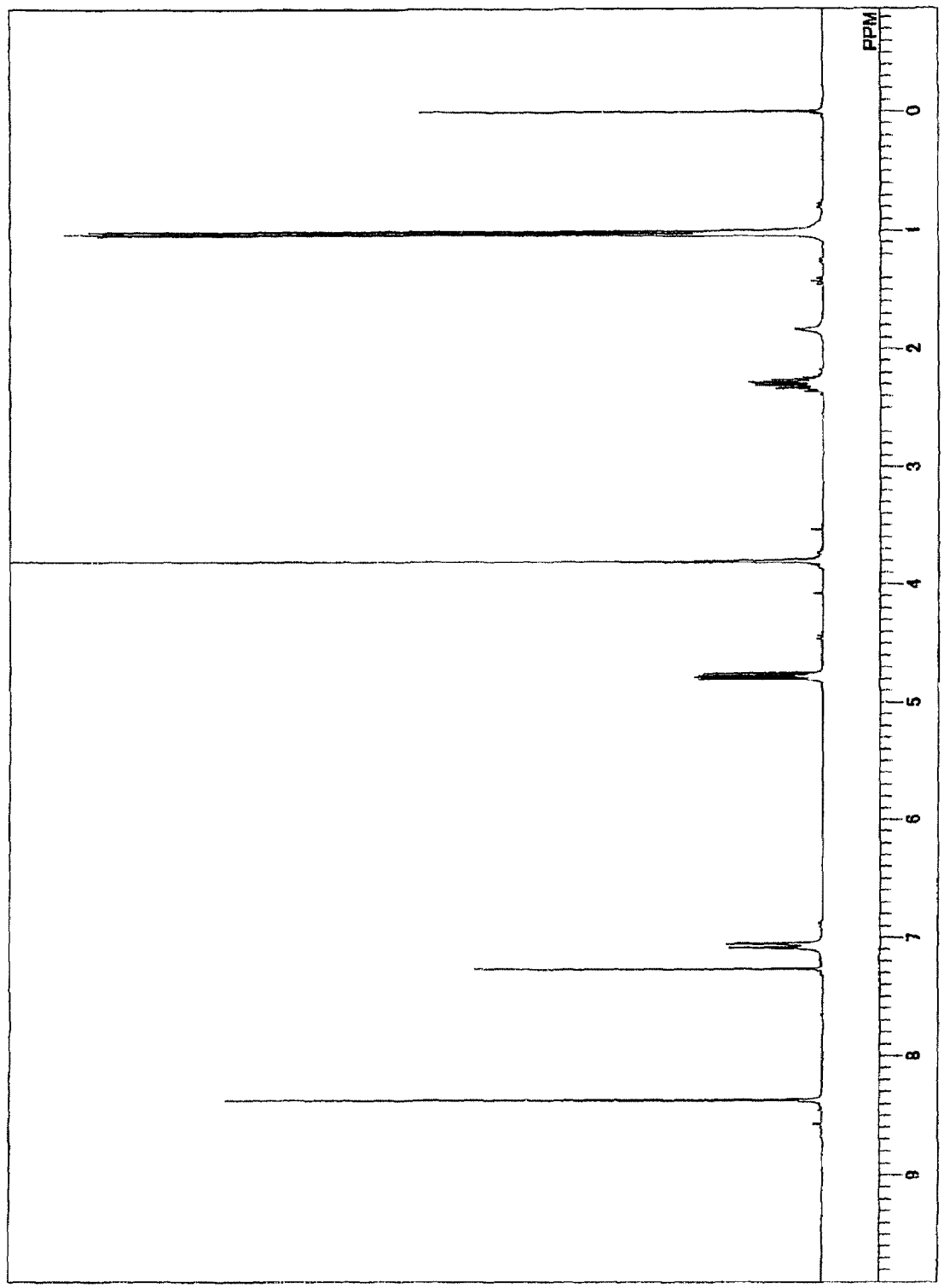

[Fig.2]
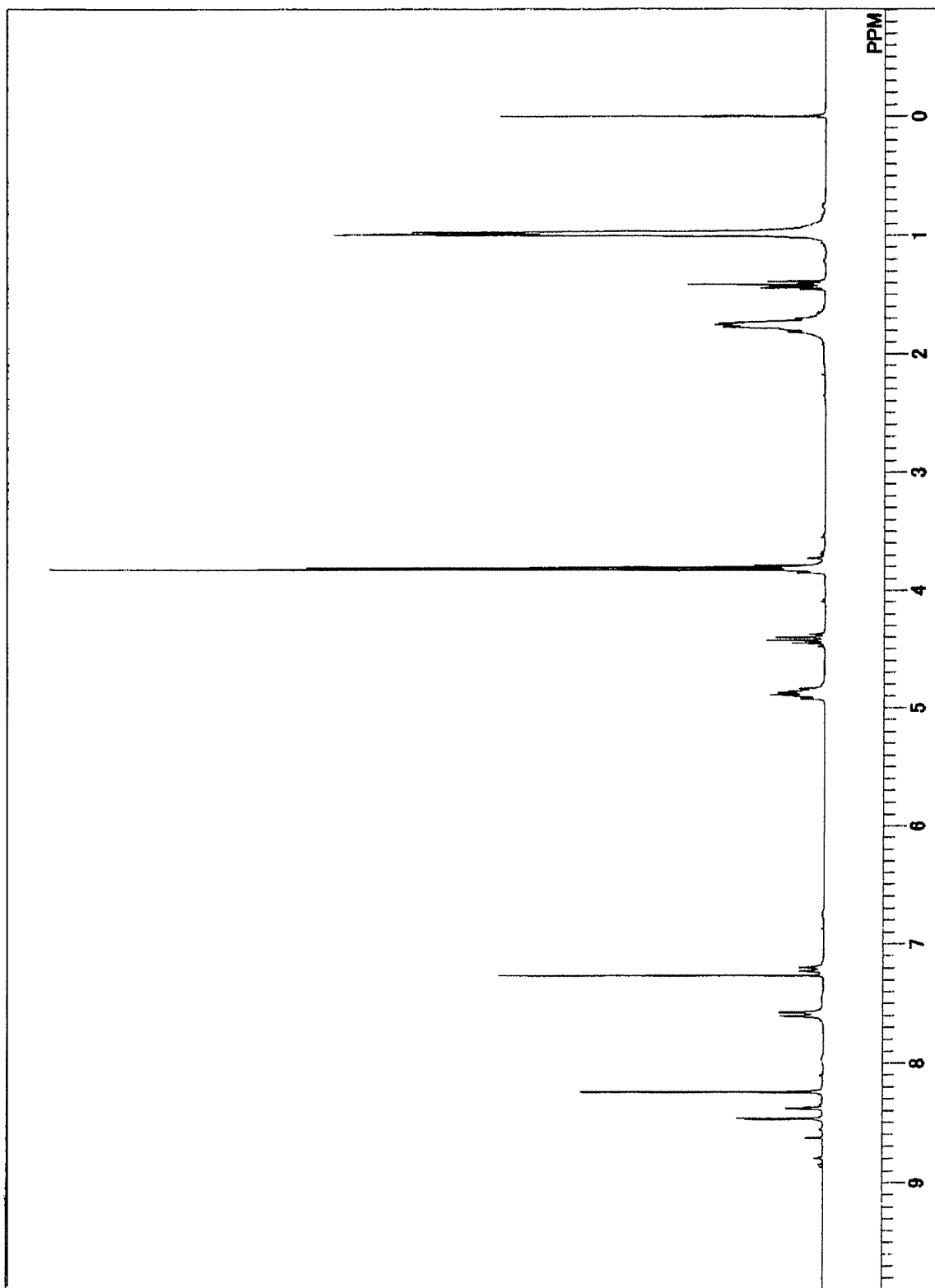

[Fig.3]
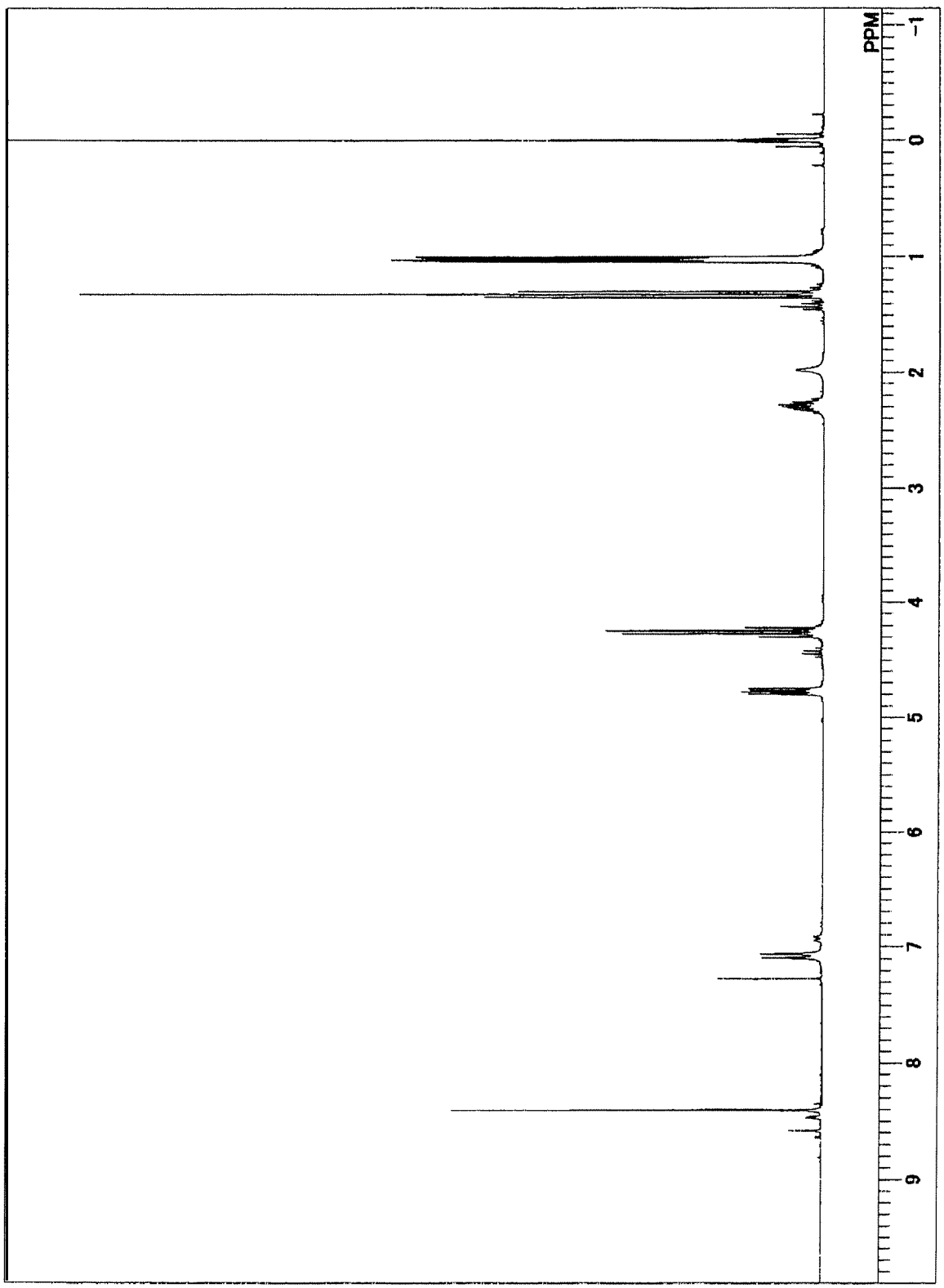

[Fig.4]
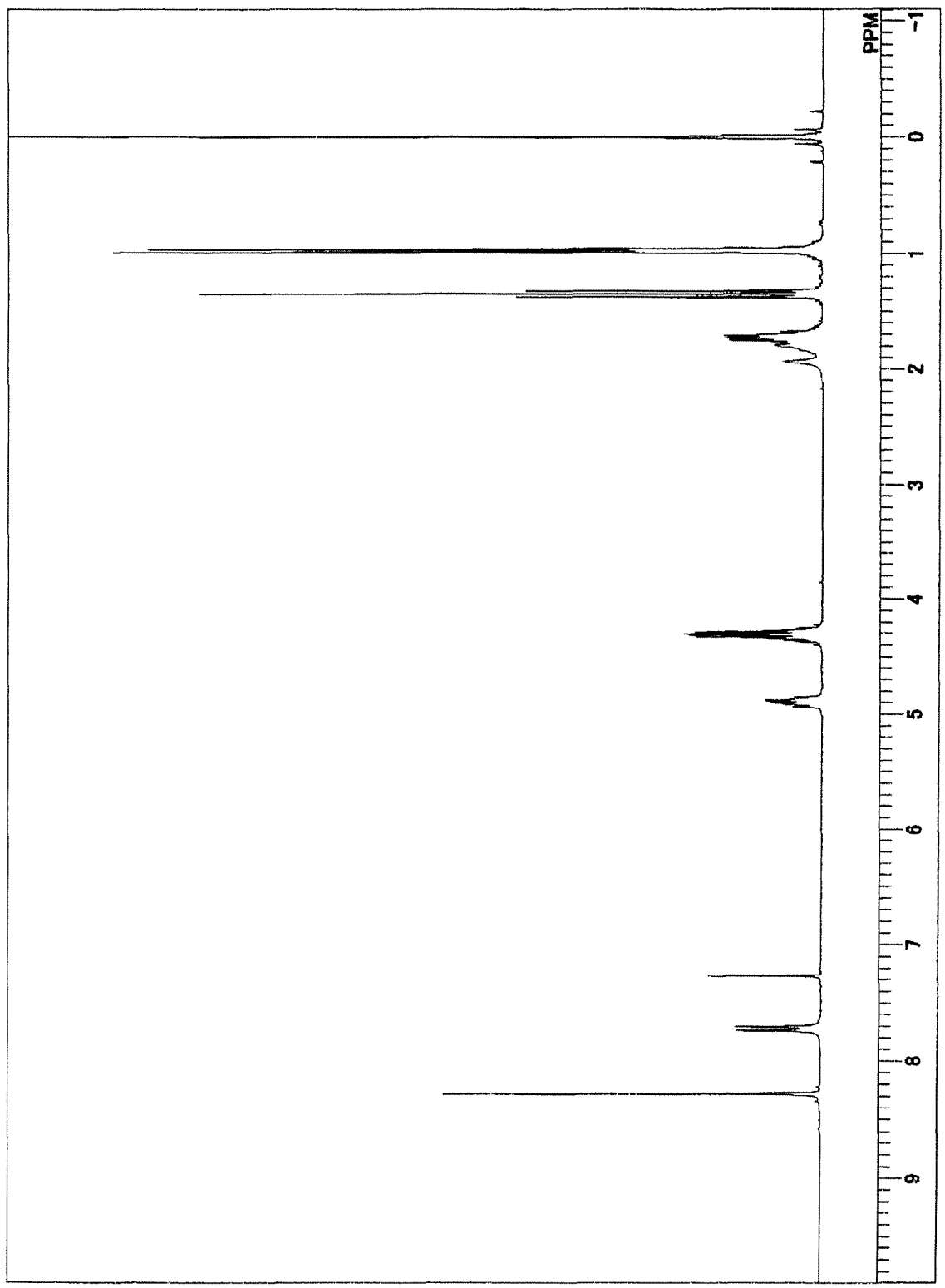

THERMOPLASTIC RESIN COMPOSITION AND MOLDED ARTICLE THEREOF

This application is a national stage entry of PCT/JP2007/063839 filed Jul. 11, 2007, which claims priority to JP 2006-203877 filed Jul. 26, 2006.

TECHNICAL FIELD

The present invention relates to a thermoplastic resin composition and a molded article thereof. More particularly, the present invention relates to a lactic acid resin composition which is increased in transparency, rate of crystallization and heat resistance, and a molded article containing the composition.

BACKGROUND ART

With increasing awareness of global environment issues, a thermoplastic resin is easily recycled as compared with a thermosetting resin and the application is expanded year by year.

On the other hand, since the depletion of fossil materials and oil resources and the increase in carbon dioxide have posed a problem, the research and development of a biodegradable resin such as an aliphatic polyester and the like and a resin synthesized by using plants as raw materials have been actively conducted. Among the aliphatic polyesters, a polylactic acid having excellent moldability has especially attracted attention as a resin derived from plant which is produced from lactic acid obtained by fermentation of grain resources such as corns and the like.

A thermoplastic resin generally has an advantage in that it is easily molded by heat and pressure, while it has drawback in heat resistance because the softening occurs at a temperature of the glass transition point (Tg) or higher. As a means to solve this problem, the reinforcement is made by a sub-material such as glass fiber, carbon fiber, talc, silica and the like. However, the heat resistance may be significantly increased by accelerating the crystallization in a resin having crystallinity.

However, since polylactic acid has a slow rate of crystallization and low heat resistance, the use expansion is limited. Particularly, in the case of a polylactic acid amorphous molding article, because it has a softening point of less than 60° C., a problem easily causing whitening, deformation and the like in daily use environments was pointed out.

In addition, if attempts are made to improve the heat resistance of polylactic acid by increasing the crystallinity by heat-treating (annealing), crystals (for example, spherocrystals) having sizes almost equal to or larger than the wavelength of light, which cause scattering of light, generally grow rapidly, and the molded article becomes opaque.

In order to solve these problems, a lot of attempts have been made to improve heat resistance and transparency by adding various additives to polylactic acid.

In patent document 1, it is described that the addition of a phosphate ester metal salt, hydrous magnesium silicate and the like as a nucleating agent is effective. However, when such a nucleating agent is used, polylactic acid has a drawback in that the transparency is impaired. In addition, talc commonly used is practically usable only from the viewpoint of the rate of crystallization. However, to achieve this, the addition amount of talc is often required to be 1% or more, and talc has a drawback of impairing transparency which is an inherent characteristic of polylactic acid.

In patent document 2, there is described a process of adding as a nucleating agent at least one kind of transparent nucleating agent selected from an aliphatic carboxylic acid amide, an aliphatic carboxylic acid salt, an aliphatic alcohol and an aliphatic carboxylic acid ester. However, in this case, the molded article had a crystallinity of 33% and a haze of 6.5%, and the result having both sufficient crystallinity and transparency was not obtained.

In patent document 3, there is described a process of using polylactic acid and an inorganic filler in which a compound having a specific functional group is used as an initiator. However, although the slip properties were improved by this process, the transparency was not maintained because an inorganic filler was added.

Patent document 1: Japanese Patent Laid-Open Publication No. 192884/2003
Patent document 2: Japanese Patent Laid-Open Publication No. 278991/1997
Patent document 3: Japanese Patent Laid-Open Publication No. 285121/2004

DISCLOSURE OF THE INVENTION

Problem to be Solved by the Invention

An object of the present invention is to provide a resin composition having increased heat resistance (high crystallinity) and transparency without impairing rigidity which a polylactic acid resin inherently has and a molded article containing the resin composition. Moreover, another object of the present invention is to provide a novel crystal nucleating agent used suitably in the resin composition.

Means for Solving the Problems

The present inventors have conducted earnest studies to solve the problems and as a result, have found that the problems may be solved by using a specific crystal nucleating agent.

That is, the thermoplastic resin composition of the present invention contains a thermoplastic resin (A) and a crystal nucleating agent (B) composed of tris(amino-acid ester)amides of trimesic acid.

The thermoplastic resin composition of the present invention preferably contains 0.01 to 10 parts by weight of the crystal nucleating agent (B) based on 100 parts by weight of the thermoplastic resin (A).

The thermoplastic resin (A) is preferably a lactic acid resin (A') and the lactic acid resin (A') is preferably a polylactic acid.

The crystal nucleating agent (B) is preferably tris(valine ester)amides of trimesic acid or tris(leucine ester)amides of trimesic acid, and in addition, the ester is preferably a methyl ester or an ethyl ester.

In the thermoplastic resin composition of the present invention, when the composition is melted at 220° C. for 3 minutes and then cooled to 100° C. at a cooling rate of 99° C./min and maintained at 100° C., the isothermal crystallization time is preferably 5 minutes or less.

A molded article of the present invention contains the thermoplastic resin composition of the present invention and has a haze of 0.1 to 15% as measured at a thickness of 100 μm and a crystallinity of 35% or more.

In addition, the present invention also provides, as a novel compound which is suitably used as the crystal nucleating agent (B), a trimesic acid tris(valine ester)amide compound represented by the following general formula (1) and a trimesic acid tris(leucine ester)amide compound represented by the following general formula (2).

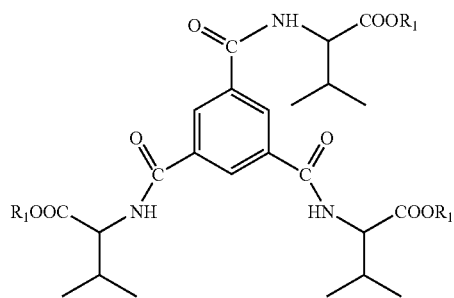

(1)

(In the formula (1), $R_1$ represents a methyl group or an ethyl group.)

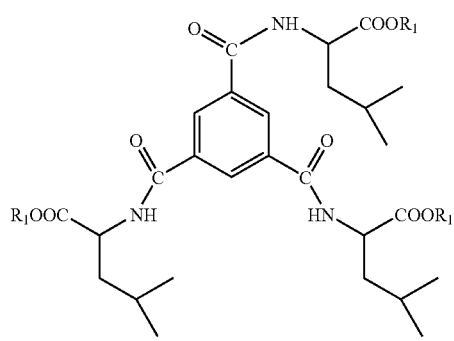

(2)

(In the formula (2), $R_1$ represents a methyl group or an ethyl group.)

Effect of the Invention

Since the rate of crystallization and transparency are increased according to the present invention, the present invention may be applied to a product which requires the molding cycle shortening, heat resistance and transparency which are conventionally difficult to be obtained and may give a contribution to the use expansion of green plastics represented by a polylactic acid resin.

BRIEF DESCRIPTION OF DRAWINGS

FIG. 1 is a $^1$H-NMR chart of trimesic acid tris(valine methyl ester) amide obtained in Example 1.
FIG. 2 is a $^1$H-NMR chart of trimesic acid tris(leucine methyl ester) amide obtained in Example 2.
FIG. 3 is a $^1$H-NMR chart of trimesic acid tris(valine ethyl ester) amide obtained in Example 3.
FIG. 4 is a $^1$H-NMR chart of trimesic acid tris(leucine ethyl ester) amide obtained in Example 4.

BEST MODE FOR CARRYING OUT THE INVENTION

Hereinafter, there will be explained in detail a thermoplastic resin composition of the present invention and a molded article thereof. First, there will be explained each component which may be used in the thermoplastic resin composition of the present invention.

<Thermoplastic Resin (A)>

A thermoplastic resin used in the thermoplastic resin composition of the present invention is not particularly limited so long as it has crystallinity. Such a thermoplastic resin includes, for example, lactic acid resin (A'), polypropylene resin (PP), polyethylene resin (PE), polyamide resin (PA), polyacetal resin (POM), polyethylene terephthalate (PET), polybutylene terephthalate (PBT), polyphenylene sulfite (PPS), polyether ether ketone (PEEK), a fluorine resin such as PTFE and the like, a liquid crystal polymer (LCP), and others. These may be used alone or in combination with two or more kinds. Among these, a lactic acid resin (A') is preferred. Further, in the following, when the lactic acid resin (A') is contained as a thermoplastic resin, the thermoplastic resin composition of the present invention may be referred to as a "lactic acid resin composition".

The "lactic acid resin" suitably used in a composition of the present invention means a polymer composition including as a main component a polymer containing 50% by mole or more, preferably 75% by mole or more of L-lactic acid units and/or D-lactic acid units as a main component, and it is synthesized by the polycondensation of lactic acid or by the ring-opening polymerization of lactide which is a cyclic dimer of lactic acid.

The lactic acid resin (A') may be a copolymer of lactic acid and a copolymerizable other monomer. Preferred is a polylactic acid having 100% by mole of lactic units and more preferred is a polylactic acid having 95% by mole or more, preferably 97% by mole or more of constitutional units derived from L-lactic acid or D-lactic acid. In addition, the lactic acid resin (A') may be a composition in which other resins, additives and the like are mixed in addition to a polymer containing 50% by mole or more of lactic acid units, so long as the properties of the polymer are not significantly impaired.

The lactic acid resin (A') has a weight average molecular weight (Mw) from 5,000 to 500,000, preferably from 10,000 to 400,000 and more preferably 50,000 to 300,000.

The monomer copolymerizable with lactic acid includes a hydroxycarboxylic acid (for example, glycolic acid, caproic acid and the like), an aliphatic polyhydric alcohol (for example, butanediol, ethylene glycol and the like), an aliphatic polyhydric carboxylic acid (for example, succinic acid, adipic acid and the like), and others.

When the lactic acid resin (A') is a copolymer, a form of arrangement of the copolymer may be any form of a random copolymer, an alternating copolymer, a block copolymer, a graft copolymer and the like. These may be a copolymer in which at least part thereof is copolymerized with a polyhydric alcohol of bifunctional or more such as ethylene glycol, diethylene glycol, triethylene glycol, a polyethylene glycol, propylene glycol, dipropylene glycol, an ethylene glycol/propylene glycol copolymer, 1,3-butanediol, 1,4-butanediol, 3-methyl-1,5-pentanediol, 1,6-hexanediol, 1,9-nonanediol, neopentyl glycol, polytetramethylene glycol, glycerin, trimethylol propane and the like; a polyvalent isocyanate such as xylylene diisocyanate, 2,4-tolylene diisocyanate and the like; polysaccharides such as cellulose, acetyl cellulose, ethyl cellulose and the like; and others. In addition, at lest part thereof may have any structure of a linear, cyclic, branched, star, three-dimensional net structure or the like.

In performing the polymerization of lactide, lactic acid or other monomers, a solvent may be used. As the solvent, there are used, for example, an aliphatic hydrocarbon such as hexane, heptane, decane and the like; an alicyclic hydrocarbon such as cyclopentane, cyclohexane and the like; an aromatic hydrocarbon such as benzene, toluene, xylene, mesitylene, ethylbenzene, and the like; an ether solvent such as diethyl ether, dioxane, tetrahydrofuran (THF), diglyme and the like; halogenated hydrocarbons such as chlorobenzene, o-dichlorobenzene, 1,1,2,2-tetrachloroethane, bromobenzene, o-dibromobenzene and the like; and others.

These solvents may be used alone or in combination with two or more kinds. From the viewpoints of the solubility of lactide or lactic acid, reaction temperature, reaction rate, easiness of solvent removal after the completion of reaction, and the like, an aromatic hydrocarbon and an ether solvent are preferred, and especially xylene and toluene are preferred. The amount used of the solvent is selected in a range from 0.1 to 20 times, preferably from 0.5 to 3 times based on the total weight of lactide or lactic acid.

In addition, as a catalyst used in the polymerization, a well-known catalyst may be used. For example, there may be mentioned a tin catalyst such as tin octanoate (tin 2-ethylhexanoate), tin dibutyl dilaurate, tin chloride and the like; a titanium catalyst such as titanium chloride, titanium tetraisopropoxide and the like; and a zinc catalyst such as zinc chloride, zinc acetate and the like. Among these, a tin catalyst is preferred and tin octanoate is more preferred. The used amount of the catalyst is 0.001 to 5 parts by weight, preferably 0.003 to 1 part by weight and more preferably 0.005 to 0.1 part by weight, based on 100 parts by weight of a monomer such as a lactic acid, lactide or the like.

The polymerization temperature is 60 to 250° C. and preferably 100 to 230° C. For example, when a solvent is not used, the reaction temperature is preferably approximately 150 to 200° C. In addition, when lactide is reacted with a polymerization initiator using xylene as a solvent and tin octanoate as a catalyst, the reaction temperature is preferably approximately 110 to 150° C.

The polymerization time varies depending on the type of a monomer used, polymerization temperature, the amount of the catalyst and the like, and is 0.1 to 24 hours, preferably 0.5 to 12 hours and more preferably 1 to 6 hours. In reality, the molecular weight is measured by gel permeation chromatography (GPC) and the like in the reaction to determine the point at which a desired molecular weight is achieved as the reaction end point.

<Crystal Nucleating Agent (B)>

The "crystal nucleating agent", which is used in the thermoplastic resin composition of the present invention, becomes a nucleating agent when it is added to the thermoplastic resin to crystallize and imparts transparency, and specifically is tris(amino-acid ester)amides of trimesic acid.

The tris(amino-acid ester)amides of trimesic acid may be produced by the amidation reaction of trimesic acid with amino-acid esters. The amidation reaction of trimesic acid with amino-acid esters may be carried out by a well-known and generally used method, for example, by a method such as the dehydration reaction of trimesic acid with amino-acid esters, the dehydrochlorination reaction of trimesic acid chloride with amino-acid esters, or the like. In consideration of the problems such as side-products at the time of the reaction or coloration or the like, trimesic acid chloride and an amino-acid ester or an amino-acid ester hydrochloride are preferably used, and an amino-acid ester hydrochloride is most preferably used.

The amino-acid esters include, for example, glycine methyl ester, glycine ethyl ester, valine methyl ester, valine ethyl ester, valine-n-propyl ester, valine-1-propyl ester, leucine methyl ester, leucine ethyl ester, leucine-n-propyl ester, leucine-1-propyl ester, alanine-1-propyl ester, aspartic acid ethyl ester, aspartic acid n-propyl ester, aspartic acid i-propyl ester, and a hydrochloride thereof. Among these, valine esters and leucine esters are preferred, and a methyl ester and an ethyl ester are preferred as an ester.

The pattern of the amidation reaction is not particularly limited. However, in consideration of the suppression of side reactions and coloration, the reaction is carried out in the range of −20 to 200° C., preferably −10 to 150° C. and more preferably −5 to 100° C., by the use of a solvent inert to the reaction.

The type of solvent used at this time is not particularly limited so long as it is inert to each of the raw materials and reaction. The solvent includes, for example, aliphatic or aromatic hydrocarbons such as hexane, cyclohexane, heptane, octane, decane, benzene, toluene, xylene, mesitylene, ethylbenzene, diethylbenzene, tetralin, p-cymene and the like; aliphatic or aromatic halogenated hydrocarbons such as dichloromethane, chloroform, 1,2-dichloroethane, tetrachloroethane, chlorobenzene, o-dichlorobenzene and the like; ethers such as tetrahydrofuran, dioxane, diethyl ether, dibutyl ether, 1,2-dimethoxyethane (glyme), 1,2-diethoxyethane, 1,2-butoxyethane, diethylene glycol dimethyl ether (diglyme), diethylene glycol dibutyl ether, anisole, phenetole, diphenyl ether and the like; an aprotic polar solvent such as dimethylformamide, dimethylacetamide, N-methylpyrrolidone, 1,3-dimethyl-2-imidazolidinone, sulfolane and the like; and others.

The solvents may be used alone or in combination with two or more kinds. In addition, the solvents may be used in an arbitrary amount. However, in consideration of the efficiency of stirring and reaction, they are used in the range of usually 1 to 100% by weight, preferably 1.5 to 50% by weight and more preferably 2 to 25% by weight, based on the total amount of the reaction substrate. Moreover, in the reaction, the reaction substrate and product may not always be dissolved in a reaction solvent.

In addition, when trimesic acid chloride is used as the source of trimesic acid, a base may be arbitrarily used as a dehydrochlorinating agent. However, in order to carry out the reaction efficiently at a low temperature, there may be desirably used an equivalent or more of a base such as triethylamine, pyridine, sodium carbonate, potassium carbonate and the like.

The crystal nucleating agent (B) may be used alone or in combination with two or more kinds. In addition, the crystal nucleating agent (B) may be used in the range of 0.01 to 10 parts by weight, preferably 0.05 to 5 parts by weight, and more preferably 0.1 to 3 parts by weight, based on 100 parts by weight of the thermoplastic resin (A). If the content of the crystal nucleating agent (B) is within the range, the effect as a crystal nucleating agent is significantly exhibited, and there may be obtained a resin composition having both high rate of crystallization and transparency.

<Various Additives and the Like>

To the thermoplastic resin composition of the present invention, other resins or polymers other than the components (A) and (B) and various additives may be added according to the objective (for example, improvement of moldability, secondary processability, degradation property, tensile strength, heat resistance, storage stability, weather resistance, flame retardancy and the like).

The other resins or polymers include polystyrene, polycarbonate resins, acrylic resins, amorphous polyester, polysulfone, polyphenylene oxide, polyimide, polyetherimide, acrylonitrile-butadiene-styrene copolymer (ABS), ethylene-α-olefin copolymer rubber, conjugated diene rubber, styrene rubber, phenolic resins, melamine resins, silicone resins, epoxy resins and the like. These may be used alone or in combination with two or more kinds.

The various additives include, for example, a plasticizer, an antioxidant, an ultraviolet absorber, a heat stabilizer, a flame retardant, an internal release agent, an inorganic additive, an organic additive, an antistatic agent, a surface wetting improver, an incineration auxiliary, a pigment, a dye, a nucleating agent, a lubricant, a natural substance and the like, and preferably include a plasticizer.

The plasticizer includes, for example, triacetin, triethylene glycol diacetate, triethyl acetyl citrate, tributyl acetyl citrate, dibutyl sebacate, silicone oil and the like.

The inorganic additive and lubricant may be used to improve blocking prevention or slipping properties of a film or a sheet. Such an inorganic additive includes silica, mica, talc, glass fiber, glass bead, kaolin, kaolinite, barium sulfate, calcium sulfate, magnesium hydroxide, wollastonite, carbon fiber, calcium silicate fiber, magnesium oxysulfate fiber, potassium titanate fiber, calcium sulfite, white carbon, clay, montmorillonite, titanium oxide, zinc oxide and the like. These may be used alone or in combination with two or more kinds. Especially when a glass fiber is used as the inorganic additive, a resin composition may be expected to be increased in heat resistance.

The organic additive includes starch and the derivative thereof, cellulose and the derivative thereof, pulp and the derivative thereof, paper and the derivative thereof, wheat flour, bean curd refuse, bran, coconut shell, coffee waste, protein, or phthalic acid-, aliphatic polybasic acid-, glycerin-, citric acid-, glycol- and olefin-low molecular weight compounds, or polyethylene terephthalate fiber, polyethylene naphthalate fiber, and aramid fiber, or the like. These may be used alone or in combination with two or more kinds.

The addition amount of the other resins, polymers or additives is arbitrarily selected depending on the application, so long as the object of the present invention is not impaired.

<Production Method of Thermoplastic Resin Composition>

As a method for producing the thermoplastic resin composition of the present invention, a well-known production method may be arbitrarily employed. For example, there may be adopted a method of uniformly premixing each component using a high-speed mixer, a low-speed mixer or the like and then melt-kneading the resulting composition using a single- or multiple-screw extruder having sufficient kneading capacity at the melting point or higher of the resin, a method of mixing and kneading at the time of melting, a method of removing a solvent after mixing in a solution, and the like.

The production of a thermoplastic composition may be carried out before the molding of a molded article, or the production and molding of the composition may be carried out simultaneously. When the composition is produced before the molding, the shape of the resin composition is preferably a pellet, rod, powder or the like.

<Thermoplastic Resin Composition>

The thermoplastic resin composition of the present invention is excellent in that it has a fast rate of crystallization. Here, in the differential scanning colorimetry (DSC) analysis, when a polymer is heated to be melt and then cooled to a predetermined temperature at a fixed rate and maintained at the predetermined temperature, the "rate of crystallization" in the present invention is determined by the time from when the predetermined temperature is maintained until when the exothermal peak due to the crystallization becomes the maximum value (hereinafter also referred to as a "isothermal crystallization time"). If the time is shorter, the rate of crystallization is faster. In addition, the predetermined temperature is arbitrarily selected depending on a polymer to be measured.

The method for the determination of the isothermal crystallization time is specifically as follows. When a resin is comprised of units derived from lactic acid as with the present invention, 5 to 6 mg of a polymer in a film state is weighed in a nitrogen-sealed pan and it is inserted into the nitrogen-sealed DSC measuring part preset at 30° C. and then heated at a temperature rising rate of 100° C./min to melt the polymer at 220° C. for 3 minutes. Subsequently, when the polymer is cooled to a predetermined crystallization temperature (for example 100° C.) at a cooling rate of 99° C./min and maintained at the same temperature, the isothermal crystallization time is determined by the time from when the polymer is cooled to the predetermined temperature until when the exothermal peak due to the crystallization becomes the maximum value.

The isothermal crystallization time of the polylactic acid resin composition of the present invention is 5 minutes or less, preferably from 0.1 to 4 minutes, more preferably from 0.2 to 3 minutes, and further more preferably from 0.2 to 1.0 minute.

<Molded Article>

A molded article of the present invention is composed of the thermoplastic resin composition of the present invention, preferably a lactic acid resin composition. The molded article of the present invention may be produced by a well-known and generally used method, for example, by the following methods.

(1) In extrusion molding, a film or a sheet may be formed by molding the thermoplastic resin composition of the present invention by a typical T die extrusion molding machine.

(2) In injection molding, a pellet of the thermoplastic resin composition of the present invention is melt and softened, and then the resultant resin composition is filled in a mold to obtain a molded article in a molding cycle of 20 to 300 seconds.

(3) In blow molding (injection blow molding, stretching blow molding or direct blow molding), for example, in case of injection blow molding, a pellet of the thermoplastic resin composition of the present invention is melt by a typical injection blow molding machine, and then the resultant resin composition is filled in a mold to obtain a pre-molded article. The resulting pre-molded article is heated again in an oven (heating furnace) and then placed in a mold maintained at a fixed temperature and pressurized air is fed to blow, and thereby a blow bottle may be obtained.

(4) In vacuum forming and vacuum pressure forming, a film or sheet molded by the same method as in the extrusion molding of the (1) is used as a pre-molded article. The resulting pre-molded article is heated to soften once and is vacuum formed or vacuum pressure formed in a mold maintained at a fixed temperature using a typical vacuum forming machine, and thereby a molded article may be obtained.

(5) In laminate molding, a laminate molded article may be obtained by a method of laminating a film or sheet obtained by the extrusion molding method (1) on other substrate by an adhesive or heat; an extrusion lamination method of directly extruding a molten resin from a T die onto a substrate such as papers, metals, plastics and the like in the same manner as in the extrusion molding method (1); a coextrusion method of melting each of the resin composition of the present invention and the like by a separate extruder and then flowing each melted resin together at die heads to simultaneously extrude; a co-extrusion lamination method combining those methods; and the like.

(6) In tape yarn molding, a film or sheet molded in the same manner as in the extrusion molding (1) is slit into a specific width and is uniaxially hot-stretched in a temperature range from 60 to 140° C., and is further heat fixed in a temperature range from 80 to 160° C. when necessary, and thereby a molded article may be obtained.

(7) In yarn molding, a yarn may be obtained by a melt spinning method of melting the polylactic acid resin composition of the present invention at a temperature of from 150 to 240° C. using an extruder and then discharging the resulting composition from a spinneret. When needed, a yarn may be formed by uniaxially hot-stretching the composition in a temperature range from 60 to 100° C., and in some cases, by further heat fixing in a temperature range from 80 to 140° C.

(8) In non-woven molding, a molded article may be formed by a span bond method or a melt blown method. In the span bond method, in the same manner as in the yarn molding (7), a web is formed by melt spinning the resin composition using a spinneret having a plurality of holes and then stretching the resulting yarn using an air sucker installed at the lower part of the spinneret, and the web is accumulated on a trapping face and further is press bonded or heat welded by an emboss roll and a smooth roll, and thereby a non-woven fabric may be obtained. In the melt blown method, the molten resin discharged from the spinneret having a plurality of holes is brought into contact with a high speed heated gas blown from a heated gas outlet to form fine fibers and the resulting fibers are accumulated on a moving support, and thereby a nonwoven fabric may be obtained.

The molded article of the present invention, which is heat treated at 80 to 120° C. for 1 to 300 seconds, has a haze of 0.1 to 15%, preferably 0.1 to 12% and more preferably 0.1 to 11% as measured at a thickness of 100 μm, and has a crystallinity of 35% or more, preferably 38 to 60% and more preferably 40 to 55%.

The "crystallinity" in the present invention is determined by differential scanning colorimetry (DSC). Specifically, firstly, a non-oriented film obtained by press molding is heat treated in an oven at 105° C. for a predetermined time period. 5 to 6 mg of the film after the heat treatment is weighed in a nitrogen-sealed pan, and it is inserted into the nitrogen-sealed DSC measuring part preset at 30° C. and then heated to 220° C. at a temperature rising rate of 10° C./min. The crystallization enthalpy (ΔHc) and crystal melting enthalpy (ΔHm) are measured to determine $[[(\Delta Hm - \Delta Hc)/(\Delta H_0)] \times 100]$, which is used as a crystallinity. Here, $\Delta H_0$ represents a completely ideal crystal melting enthalpy, for example, the $\Delta H_0$ of polylactic acid is 93 J/g. In addition, the "haze" in the present invention is a value measured by a haze meter.

<Application>

The thermoplastic resin composition of the present invention may be molded by the various molding and processing methods described above and may be suitably used for various applications without any particular limitation. In addition, these molded articles may be employed for various applications, such as automobile parts, home electric appliance material parts, electric and electronic components, building members, civil engineering members, agricultural materials, commodities, various films, breathable films or sheets, foamed products suitable for general industrial applications and recreation uses, yarns, textiles, medical or sanitary materials, and the like, and preferably, for automobile material parts, home electric appliance material parts and electric and electronic parts which require heat resistance and impact resistance or commodities which require heat resistance and transparency.

Specifically, there may be mentioned the development into parts such as front doors, wheel caps and the like, in which resin parts are conventionally used, in the automobile part material uses; the development into package parts of products such as personal computers, headphone stereos and mobile phones in home electric appliance material part uses; and the development into reflective material films and sheets and polarizing films and sheets in the electric and electronic parts; and the development into cups for drinking, trays for vegetables, blister packs or the like in commodities.

EXAMPLES

Hereinafter, the present invention will be specifically explained based on Examples, but the present invention is not limited by these Examples.

<Liquid Chromatography (Purity Analysis)>

The purity was determined by the peak area ratio using a detector, "UV 1570" manufactured by JASCO Corporation, two pumps in series "PU 1580" manufactured by JASCO Corporation (Column: "YMC A-312" manufactured by YMC Co., Ltd., Column Temperature: 35° C., Mobile Phase: acetonitrile/water=70/30 (V/V), Flow Rate: 1 mL/min).

<Rate of Crystallization (Isothermal Crystallization Time)>

The rate of crystallization was determined by DSC ("DSC-60" manufactured by Shimadzu Corporation). 5 to 6 mg of a non-oriented film obtained by press molding was weighed in a nitrogen-sealed pan, and it was inserted into the nitrogen-sealed DSC measuring part preset at 30° C. and then heated at a temperature rising rate of 100° C./min to melt at 220° C. for 3 minutes. After the melting, it was cooled to 100° C. at a cooling rate of 99° C./min. The time taken for the crystallization peak to become maximum was measured using the time when it was cooled to 100° C. as the starting time.

<Crystallinity>

The crystallinity was measured by DSC ("DSC-60" manufactured by Shimadzu Corporation). A non-oriented film obtained by press molding was heat treated in an oven at 105° C. for a predetermined time period. 5 to 6 mg of the film after the heat treatment was weighed in a nitrogen-sealed pan, and it was inserted into the nitrogen-sealed DSC measuring part preset at 25° C. and then heated to 220° C. at a temperature rising rate of 10° C./min. The crystallization enthalpy (ΔHc) and crystal melting enthalpy (ΔHm) were measured to determine $[[(\Delta Hm - \Delta Hc)/(\Delta H_0)] \times 100]$, which was used as a crystallinity. Here, $\Delta H_0$ represents a completely ideal crystal melting enthalpy, and a value of 93 J/g of polylactic acid was used.

<Transparency (Haze)>

The haze was determined by a hazemeter "NDH 2000" manufactured by Nippon Denshoku Industries Co., Ltd.) according to JIS K7105.

Example 1

Synthesis of Crystal Nucleating Agent

To a 200 mL glass reaction apparatus equipped with a stirrer, a thermometer, a dropwise addition funnel and a condenser, 20.78 g (124 mmol) of L-valine methylester hydrochloride, 23.7 g (300 mmol) of pyridine and 100 mL of chloroform were added, and the mixture was dissolved at room temperature while flowing nitrogen. Thereafter, the mixture was cooled to 2 to 3° C. in an ice water bath, and a solution obtained by dissolving 10.62 g (40 mmol) of trimesic acid chloride in 40 mL of chloroform was dropwise added to the mixture using a dropwise addition funnel at the same temperature over two hours, and then the resulting mixture was reacted at the same temperature for 3 hours.

After the reaction, the ice water bath was removed to return the mixture to the room temperature. The reaction solution was transferred to a 1-L separating funnel and washed with 200 mL of distilled water to separate the lower layer (chloroform layer). The lower layer was washed with 200 mL of 0.5 N aqueous hydrochloric acid to separate a lower layer. Subsequently, the separated lower layer was washed with 200 mL of 0.5 N aqueous sodium hydrogen carbonate to separate a lower layer. Further, the separated lower layer was washed with 200 mL of 10% by weight of sodium chloride solution to separate a lower layer. To the separated lower layer, 50 g of anhydrous sodium sulfate was added, and the mixture was stirred and dehydrated with a magnetic stirrer at room temperature for two hours. The resulting mixture was filtered and washed with chloroform, and the filtrate was concentrated and dried up with an evaporator. Further, 100 mL of toluene was added to the concentrate and the mixture was concentrated and dried up with an evaporator. After cooling a slurry obtained by adding 160 g of toluene to the concentrate thus obtained, the slurry was filtered and washed, and the filtered agglomerates were dried to obtain 10.9 g of a white powder (hereinafter also referred to as a "crystal nucleating agent (B-1)").

The purity of the crystal nucleating agent (B-1) measured by a high performance liquid chromatography was 99.0% by area. In addition, by the NMR measurement, elemental analysis and the like, the resulting crystal nucleating agent (B-1) is confirmed to be a tris(valine methyl ester) amide of trimesic acid represented by the following formula (1). The results of the elemental analysis are shown in Table 1. In addition, the $^1$H-NMR chart is shown in FIG. 1. Further, the $^1$H-NMR measurement was conducted using $CDCl_3$ as a solvent and "GSX 270" manufactured by JEOL Ltd.

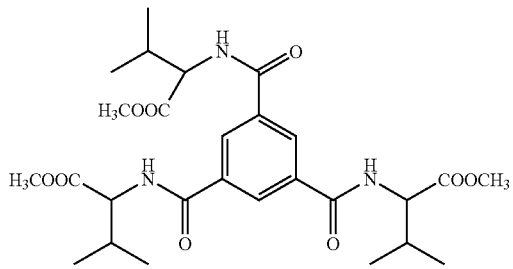

(I)

TABLE 1

|   | Calculated Value (%) | Actual Measurement Value (%) |
|---|---|---|
| C | 59.0 | 59.2 |
| H | 7.2 | 7.4 |
| N | 7.7 | 7.5 |

Example 2

Synthesis of Crystal Nucleating Agent

To a 500 mL glass reaction apparatus equipped with a stirrer, a thermometer, a dropwise addition funnel and a condenser, 26.8 g (0.1 mol) of trimesic acid chloride, 56.3 g (0.31 mol) of L-leucine methyl ester hydrochloride and 300 mL of tetrahydrofuran were added, and the mixture was dissolved at room temperature while flowing nitrogen. Thereafter, a mixed solution of 57.9 g (0.732 mol) of pyridine and 57.9 g of tetrahydrofuran was dropwise added to the mixture over 1.5 hours using a dropwise addition funnel, and then the resulting mixture was reacted at the same temperature for 3 hours. As the reaction proceeds, heat generation occurred, but the reaction was conducted while maintaining the reaction temperature at room temperature by water cooling.

The resulting reaction mass was a slurry containing crystals of the by-produced pyridine hydrochloride and was discharged in 1 L of distilled water and stirred for one hour, and then the resultant was filtered to obtain crystals of the targeted trimesic acid tris(leucine methyl ester)amide. The crystals were subjected to sludging (stirring washing and filtering) twice with 500 mL of distilled water and the filtered agglomerates were dried to obtain 64.9 g of white powders (hereinafter also referred to as a "crystal nucleating agent (B-2)").

The purity of the crystal nucleating agent (B-2) measured by a high performance liquid chromatography was 99.1% by area. In addition, by the NMR measurement, elemental analysis and the like, the resulting crystal nucleating agent (B-2) is confirmed to be a trimesic acid tris(leucine methyl ester) amide represented by the following formula (II). The results of the elemental analysis are shown in Table 2. In addition, the $^1$H-NMR chart is shown in FIG. 2.

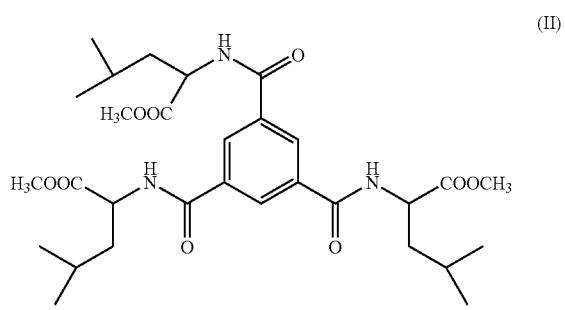

(II)

TABLE 2

|   | Calculated Value (%) | Actual Measurement Value (%) |
|---|---|---|
| C | 60.9 | 60.6 |
| H | 7.6 | 7.7 |
| N | 7.1 | 7.0 |

Example 3

Synthesis of Crystal Nucleating Agent 65.1 g of white powders (hereinafter also referred to as a "crystal nucleating agent (B-3)") was obtained in the same manner as in Example 2 except for changing 56.3 g (0.31 mol) of L-leucine methyl ester hydrochloride in Example 2 to 56.3 g (0.31 mol) of L-valine ethyl ester. The purity of the crystal nucleating agent (B-3) measured by a high performance liquid chromatography was 99.3% by area. In addition, by the NMR measurement, elemental analysis and the like, the resulting crystal nucleating agent (B-3) is confirmed to be a trimesic acid tris(valine ethyl ester) amide represented by the following formula (III). The results of the elemental analysis are shown in Table 3. In addition, the $^1$H-NMR chart is shown in FIG. 3.

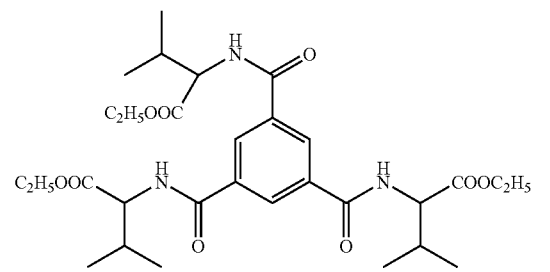

(III)

TABLE 3

|   | Calculated Value (%) | Actual Measurement Value (%) |
|---|---|---|
| C | 60.9 | 60.8 |
| H | 7.6 | 7.5 |
| N | 7.1 | 7.1 |

Example 4

Synthesis of Crystal Nucleating Agent 76.2 g of white powders (hereinafter also referred to as a "crystal nucleating agent (B-4)") was obtained in the same manner as in Example 2 except for changing 56.3 g (0.31 mol) of L-leucine methyl ester in Example 2 to 67.6 g (0.31 mol) of L-leucine ethyl ester. The purity of the crystal nucleating agent (B-4) measured by a high performance liquid chromatography was 99.3% by area. In addition, by the NMR measurement, elemental analysis and the like, the resulting crystal nucleating agent (B-4) is confirmed to be a trimesic acid tris(leucine ethyl ester) amide represented by the following formula (IV). The results of the elemental analysis are shown in Table 3. In addition, the $^1$H-NMR chart is shown in FIG. 4.

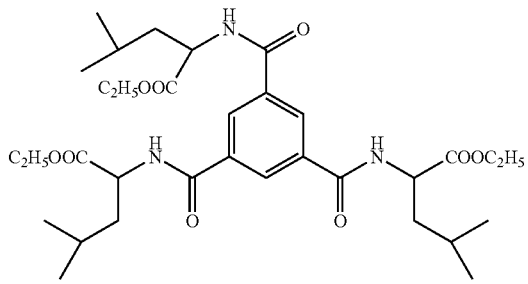

(IV)

TABLE 4

|   | Calculated Value (%) | Actual Measurement Value (%) |
|---|---|---|
| C | 62.6 | 62.5 |
| H | 8.1 | 7.9 |
| N | 6.6 | 6.7 |

Examples 5 to 10

Using a laboplast mill, the crystal nucleating agents (B-1) to (B-4) synthesized in Examples 1 to 4 and commercially available polylactic acid (A-1) [Trademark: LACEA, manufactured by Mitsui Chemicals Inc., grade H-100, Mw=173000] were kneaded in parts by weight shown in Table 5 under the conditions of a temperature of 200° C. for 5 minutes and a rotational speed of 50 rpm. The kneaded product was pressed for 5 minutes under the conditions of 200° C. and 10 MPa to obtain a film having a thickness of 100 μm. The isothermal crystallization time of the resulting film was measured as described above. Further, the film was placed in an oven at 105° C. for 20 seconds and for 60 seconds and was subjected to annealing (heat treatment), and then the crystallinity and transparency (haze) of the film before and after annealing were measured as described above. The results are shown in Table 5.

Comparative Example 1

A film was prepared in the same manner as in Examples 5 to 10 except for using a crystal nucleating agent (EBL: ethylene bislauric acid amide) in the amounts shown in Table 5 based on 100 parts by weight of commercially available polylactic acid (A-1) [Trademark: LACEA, manufactured by Mitsui Chemicals Inc., grade H-100, Mw=173000]. The isothermal crystallization time, crystallinity and transparency of the film were measured. The results are shown in Table 5.

Comparative Example 2

A film was prepared in the same manner as in Examples 5 to 10 except for using 100 parts by weight of commercially available polylactic acid (A-1) [Trademark: LACEA, manufactured by Mitsui Chemicals Inc., grade H-100, Mw=173000] without using a transparent nucleating agent. The isothermal crystallization time, crystallinity and transparency of the film were measured. The results are shown in Table 5.

TABLE 5

| | Composition | | | | Isothermal Crystallization Time (min) | Crystallinity (%) | | | Haze (%) | | |
| | Lactic Acid Resin (A') | | Crystal Nucleating Agent (B) | | | Annealing Time (sec) | | | Annealing Time (sec) | | |
| | Type | Parts by Weight | Type | Parts by Weight | | 0 | 20 | 60 | 0 | 20 | 60 |
|---|---|---|---|---|---|---|---|---|---|---|---|
| Example 5 | A-1 | 100 | B-1 | 0.5 | 0.41 | 6.1 | 8.9 | 43.5 | 0.91 | 1.38 | 6.47 |
| Example 6 | A-1 | 100 | B-1 | 1.0 | 0.24 | 5.5 | 9.7 | 42.1 | 0.85 | 1.32 | 6.58 |
| Example 7 | A-1 | 100 | B-1 | 3.0 | 0.42 | 7.4 | 9.3 | 43.3 | 0.90 | 1.50 | 6.80 |
| Example 8 | A-1 | 100 | B-2 | 0.5 | 0.27 | 8.2 | 10.2 | 40.1 | 0.88 | 2.10 | 7.25 |
| Example 9 | A-1 | 100 | B-3 | 0.5 | 0.44 | 6.6 | 9.3 | 39.8 | 0.57 | 1.88 | 7.82 |
| Example 10 | A-1 | 100 | B-4 | 0.5 | 0.51 | 5.8 | 11.0 | 41.8 | 0.73 | 2.24 | 6.92 |
| Comparative Example 1 | A-1 | 100 | EBL | 0.5 | 1.5 | 0 | 5.1 | 28.6 | 0.70 | 4.01 | 57.7 |
| Comparative Example 2 | A-1 | 100 | — | — | >30 *1 | 0 | 0 | 5 | 0.21 | 0.26 | 0.33 |

*1: not detected at the measurement of 30 min.

The invention claimed is:

1. A thermoplastic resin composition, comprising: a kneaded product of a thermoplastic resin (A) and a crystal nucleating agent (B) composed of tris(amino-acid ester)amides of trimesic acid, wherein the thermoplastic resin (A) is polylactic acid.

2. The thermoplastic resin composition according to claim 1, wherein the thermoplastic resin composition contains 0.01 to 10 parts by weight of the crystal nucleating agent (B) based on 100 parts by weight of the thermoplastic resin (A).

3. The thermoplastic resin composition according to claim 1, wherein the crystal nucleating agent (B) is tris(valine ester) amides of trimesic acid.

4. The thermoplastic resin composition according to claim 1, wherein the crystal nucleating agent (B) is tris(leucine ester)amides of trimesic acid.

5. The thermoplastic resin composition according to claim 1, wherein an isothermal crystallization time is 5 minutes or less when the thermoplastic resin composition is melted at 220° C. for 3 minutes and then cooled to 100° C. at a cooling rate of 99° C./min and maintained at 100° C.

6. A molded article, comprising the thermoplastic resin composition according to claim 1, and having a haze of 0.1 to 15% as measured at a thickness of 100 μm and a crystallinity of 35% or more.

7. A molded article comprising the thermoplastic resin composition of claim 1.

8. The thermoplastic resin composition according to claim 1, which is capable of giving a molded article having a haze of 0.1 to 15% as measured at a thickness of 100 μm and a crystallinity of 35% or more.

9. The thermoplastic resin composition according to claim 1, wherein the crystal nucleating agent (B) is a trimesic acid tris(valine ester) amide compound represented by the following general formula (1):

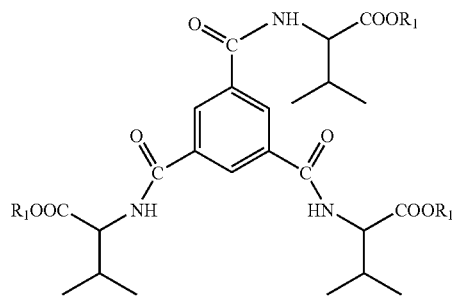

wherein $R_1$ represents a methyl group or an ethyl group.

10. The thermoplastic resin composition according to claim 1, wherein the crystal nucleating agent (B) is a trimesic acid tris(leucine ester) amide compound represented by the following general formula (2):

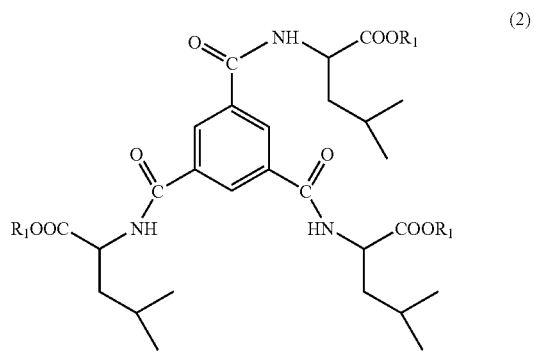

wherein $R_1$ represents a methyl group or an ethyl group.

* * * * *